(12) United States Patent
Kalnitsky

(10) Patent No.: US 7,546,355 B2
(45) Date of Patent: Jun. 9, 2009

(54) NETWORK ARCHITECTURE FOR DATA TRANSMISSION

(75) Inventor: Yury Kalnitsky, Long Beach, NY (US)

(73) Assignee: Bloomberg Finance L.P., New York, NY (US)

( * ) Notice: Subject to any disclaimer, the term of this patent is extended or adjusted under 35 U.S.C. 154(b) by 0 days.

(21) Appl. No.: 10/760,137

(22) Filed: Jan. 16, 2004

(65) Prior Publication Data

US 2005/0198097 A1  Sep. 8, 2005

(51) Int. Cl.
G06F 15/16 (2006.01)
(52) U.S. Cl. .................... 709/219; 709/227
(58) Field of Classification Search ............. 709/219, 709/227
See application file for complete search history.

(56) References Cited

U.S. PATENT DOCUMENTS

| 4,903,201 | A | | 2/1990 | Wagner | |
|---|---|---|---|---|---|
| 6,160,843 | A | * | 12/2000 | McHale et al. | 375/222 |
| 6,189,039 | B1 | | 2/2001 | Harvey et al. | |
| 6,321,212 | B1 | | 11/2001 | Lange | |
| 6,546,375 | B1 | | 4/2003 | Pang et al. | |
| 6,691,094 | B1 | | 2/2004 | Herschkorn | |
| 6,901,445 | B2 | * | 5/2005 | McCanne et al. | 709/225 |
| 2002/0013823 | A1 | * | 1/2002 | Eubanks | 709/217 |
| 2002/0067730 | A1 | * | 6/2002 | Hinderks et al. | 370/395.52 |
| 2002/0143951 | A1 | * | 10/2002 | Khan et al. | 709/227 |
| 2003/0026254 | A1 | * | 2/2003 | Sim | 370/392 |
| 2005/0010653 | A1 | * | 1/2005 | McCanne | 709/219 |
| 2005/0129017 | A1 | * | 6/2005 | Guingo et al. | 370/390 |
| 2006/0242311 | A1 | * | 10/2006 | Mai et al. | 709/229 |

FOREIGN PATENT DOCUMENTS

WO  WO 02/078258  10/2002

OTHER PUBLICATIONS

International Search Report completed Oct. 6, 2005 in counterpart international application No. PCT/US04/033597 (Form PCT/ISA/210, second sheet and extra sheet).
Ross Finalyson: "The UDP Multicast Tunneling Protocol," Internet Engineering Task Force, Live.Com, Nov. 21, 2003.
Parnes P. et al.: "Lightweight application multicast tunnelling using mTunnel," Computer Communications, Elsevier Science Pub. BV, Amsterdam, NL, vol. 21, No. 15.
Beichuan Zhang et al.: "Host multicast: a framework for delivering multicast to end users" Proceedings of IEEE Infocom 2002, 21st Annual Joint Conference of the IEEE Computer and Communications Societies, New York, NY, Jun. 23-27, 2002, vol. 3, 23, pp. 1366-1375.
Eriksson H: "MBONE : The Multicast Backbone," Communications of the Association for Computing Machinery, ACM, New York, NY, US, vol. 37, No. 8, Aug. 1, 1994, pp. 54, 55-60.

* cited by examiner

*Primary Examiner*—Jason Cardone
*Assistant Examiner*—Chirag R Patel
(74) *Attorney, Agent, or Firm*—Frank J. DeRosa; David V. Rossi; Frommer Lawrence & Haug LLP

(57) ABSTRACT

A content distribution network with client side multicasting properties that operates with a reduced bandwidth is provided. The requested content, such as multimedia content, is provided in a format suitable for transmission over existing unicast communication links and is then changed to a multicast format for local distribution. This allows an application provider to transmit a single unicast stream of content to a client-side media server in a local area network (LAN) and then distribute it to multiple interested users within the LAN using a multicasting transmission format. This significantly reduces bandwidth requirements by providing a single unicast transmission to a LAN rather than supply each user within the LAN with a dedicated content stream.

25 Claims, 3 Drawing Sheets

NETWORK ARCHITECTURE FOR DATA TRANSMISSION

The invention relates to improvements in data transmission networks, and, more particularly, to network arrangements that reduce the amount of bandwidth required to transmit information to multiple network users.

BACKGROUND OF THE INVENTION

Many different types of information may be transmitted from one point on a computer network to another. Such information is sometimes referred to as "content" which may include various forms or combinations of electronic information such as text, audio, and/or visual information (often referred to as multimedia content). One form of content transmission across a network is through a technique known as "streaming." Using this streaming technique, a person at a remote computer terminal may request content over the Internet or other network which is subsequently "streamed" to the content requester. Employing one of several widely available media players such as Windows Media Player™, or RealOne Player™, the user may quickly and easily observe the streamed content at his or her computer terminal.

When a user requests a content stream directly from an information source, the response to the request is often handled by a server or other remote computer that sends a content stream directly to the requester. This method of sending an information stream from one point to another, in a more or less direct fashion, is called a "unicast" transmission in which one dedicated data stream is typically sent per request. Another way in which the server may respond to the request is by transmitting an information stream throughout the communication network without regard to whether a user downstream is interested the information being streamed. This method of sending information over a network is sometimes referred to as a "broadcast" transmission.

An alternative approach to unicast and broadcast transmission is called "multicasting." Using this approach, a single stream of information is sent from a content server which is subsequently "divided" into additional identical content streams and provided to users.

Multicasting, unicast, and broadcast transmission all involve bandwidth issues that are of particular concern to network service providers.

SUMMARY OF THE INVENTION

Generally speaking, the invention provides for providing requested content, such as multimedia content, in a format suitable for transmission over existing unicast communication links and then subsequently changing the content to a multicast format for local distribution. This allows an application provider to transmit a single unicast stream of content to, e.g., a client-side media server in a local area network (LAN), and then distribute it to multiple interested users within the LAN using a multicasting transmission format. This significantly reduces bandwidth requirements by providing a single unicast transmission to a LAN rather than supplying each user within the LAN with a dedicated content stream.

Embodiments of the invention provide networks and methods that reduce the bandwidth required to transmit content while preserving a minimum amount of bandwidth in an upstream tail circuit for mission critical communication with a network server or other remote computer. This result is accomplished without relying on specialized multicasting hardware in the point-to-point transmission path.

Fault detection software deployed within the disclosed system may monitor network transmission paths and the status and activity level of client-side servers that locally distribute content to ensure a certain minimum quality of service. If a network connection or client-side server is overburdened or malfunctioning, the detection software may recognize this problem and take an appropriate remedial action such as redistributing the workload among client-side servers or rerouting the transmitted content across alternate, available or properly functioning transmission paths.

A method according to one embodiment of the invention provides electronic content to users from at least one remote electronic content source. The method comprises providing a unicast transmission of content, e.g., streaming media, from the at least one content source, receiving the content at a client-side server at a location serving a plurality of users; processing the received content in the client-side server such that the content may be provided to more than one of the plurality of users served by the location; and distributing the received and processed content to each of the plurality of users which has provided a request for the content.

In an embodiment of the invention, the received and processed content is distributed to a multicast group including each of the plurality of users which has provided a request for content by subscribing to the multicast group.

The client-side server is preferably monitored for distribution of content to the plurality of users. When the client-side server is not distributing the content to any of the plurality of users, transmission is terminated of the content from the at least one content source to the client-side server.

In an embodiment of the invention, additional content is transmitted from the at least one content source to the client-side server in response to a request by a user of the plurality of users serviced at the location by the client-side server for content not currently being transmitted by the at least one content source to the client-side server. Preferably, the additional content is transmitted in another unicast transmission. The additional unicast may be posted to an additional multicast group so that other users may access the additional content using the same additional unicast transmission from the at least one content source. The additional unicast may be provided by converting multicast format content into unicast format content for transmission to the client-side server.

Users may be running one or more applications in addition to receiving the content. The invention may also provide for monitoring transmitted content and limiting transmitted content to maintain an amount of bandwidth suitable for servicing at least one other application being run by each of a plurality of users other than content being received by such user.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
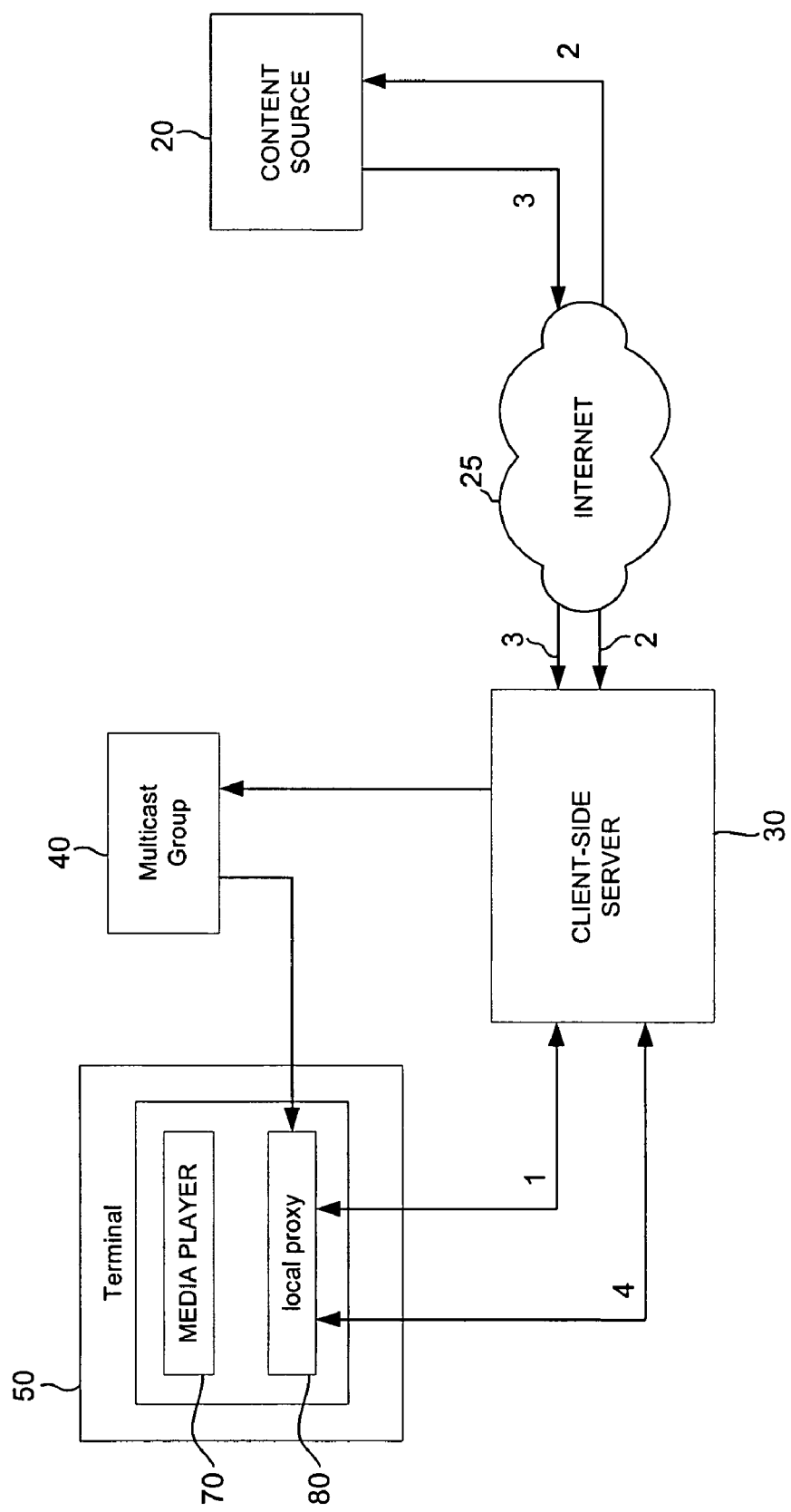
FIG. 1 is a block diagram of one embodiment of a communication network constructed in accordance with the principles of the present invention.

FIG. 1 is a block diagram of a content distribution network 10 constructed in accordance with the principles of the present invention. As shown, network 10 includes an electronic content source 20 coupled to a client-side server 30 through Internet 25. Although depicted as a server in FIG. 1, content source 20 may be any type of remote computer, network, database or other repository suitable for storing and retrieving electronic content. Similarly, client-side server 30 may be any suitable computer, network, or other electronic processing unit capable of requesting, receiving, and/or manipulating content streams as further described herein. In some embodiments, content source 20 and client-side server 30 may be configured similarly or identically to one another (e.g., server 30 may be configured as a "headless terminal" version of source 20). Client-side server 30 may include proprietary or other specialized software and/or hardware for manipulating or modifying content streams. Such software and/or hardware may be controlled or configured by a service or content provider.

Furthermore, although generally represented as Internet 25, this communication path may be any other suitable network interconnection desired such as an Intranet, a wireless interconnection, LAN, WAN, or other interconnection such as a secure hardwired interconnection. Internet 25, content source 20, and client-side server 30 are shown only for the purpose of illustration and not limitation. Moreover, it will be understood that although the present invention is well suited for the distribution of streaming media content, other suitable content distribution schemes may be used if desired.

Generally speaking, network 10 of the present invention operates as follows. A user (not shown) at terminal 50 selects a certain piece of electronic content stored on server 20. This request is routed to client-side server 30 over communication path 1 which forwards it to content source 20 via communication link 2. Communications paths 1 and 2 may be any suitable data communication paths known in the art such as an Ethernet link. Content source 20 processes the request and transmits the requested content to client-side server 30 for local distribution. The content is preferably transmitted to client-side server 30 over a single channel in standard unicast fashion over communication link 3. Once the content is received by server 30, rather than being forwarded directly to terminal 50, it is forwarded to a multicast group 40 (typically a virtual group or entity implemented in software on server 30), to which the requester terminal 50 is a member. The requester at terminal 50 then receives the content from a local software proxy 80 associated with that terminal. Local proxy 80 may receive the multicast transmitted content and covert it back into a suitable unicast format by manipulating the multicast data packets and arranging the content information into a proper order (i.e., sequential). In some instances, this may involve "producing" additional packets to fill any in "gaps" or missing packets in the received data by interpolation or other known data restoration technique. This content may then be displayed on the terminal using a conventional media player 70 such as Windows Media Player™, or RealOne Player™, or any other suitable content displaying software. Generating missed data packets as described above tends to prevent some content players from "stalling" when they attempt to retrieve data packets missing from the content stream, allowing the players to continuously display content despite "missing" some data.

Another way in which content may be requested by a user is by joining or "subscribing" to multicasting group 40. In this case, a monitoring program notices that a subscriber has joined the multicast group and is requesting the content associated therewith (such associated content may be predefined or may be user selectable). In response to the subscription, the monitoring program invokes a pseudo-media player (similar to the media players described above) that requests a unicast transmission of the selected content from source 20 (discussed in more detail below in connection with FIG. 2). This content is then distributed to the members of that group interested in receiving the requested content.

In some embodiments, content source 20 and client-side server 30 may communicate with one another such that source 20 is aware of the identity and/or number of users that are subscribing to a particular multicast group 40 or that are receiving the unicast transmitted content. This may be done for a number of network management reasons including assessing popularity of certain content, or determining whether unauthorized or an unusual number of users are accessing or requesting certain content. Server 20 may be configured to discontinue or modify the content broadcast if such or other conditions are detected.

It will be appreciated that although only one multicasting group 40 is shown in FIG. 1, that multiple such groups may exist at a particular location. Such groups may receive similar or related types of content so that a particular user need not subscribe to many multicast groups that are only associated with one content stream. Moreover the content associated with certain multicast groups may be user selectable, such that the users or network administrators at a particular location may freely associate or disassociate certain content streams with a particular multicast group to create customized groups of interest.

One advantage of posting the content to multicast group 40 is that other users at the requestor's the location may also access the resident content without invoking another dedicated unicast content stream that is transmitted across network 20. This is because client-side server 30 preferably includes multicasting hardware that permits replication of the incoming content stream so additional content streams may be sent to other terminals 50 at the user's location (not shown). Thus, when another user requests a content stream, before a request to content source 20 is made, the requesting terminal first polls (or listens) client-side server 30 through communication link 4 (sometimes referred to as a "heartbeat") to determine if the desired content is already being received by server 30. If this is the case, the new requester merely joins the multicast group and receives the desired content therefrom rather than invoking a new content stream from source 20. This arrangement allows the amount of transmission bandwidth required by network 10 to be drastically reduced by eliminating duplicative content streams. It is also advantageous because this system may be implemented on a conventional network suitable for unicast communication and does not rely on specialized, expensive multicasting hardware.

Several methods may be employed to produce and/or convert unicast content streams received from source 20 into the multicast format streams provided by client-side server 30 in accordance with the present invention. In one embodiment, source 20 may merely provide a unicast format data stream that is manipulated by server 30 upon arrival such that it is converted into a form suitable for multicast distribution. This may be accomplished using any of the methods described herein or by using any other technique known in the art. Alternatively, source 20 may provide a multicast format stream that is "placed into" a unicast format by adding or removing header bits or otherwise manipulating the content stream so it appears to be in a unicast format before transmission to server 30. Upon arrival at server 30, the header file or additional bits may be stripped away or otherwise manipulated, leaving the data stream in its original multicast format.

Transmitting content in a unicast format and then locally delivering the content using multicast distribution techniques, in accordance with one embodiment of the present invention, allows the present system to reliably provide content without using large amounts of bandwidth. The unicast transmission of content from source 20 to server 30 is a reliable method for transmitting data due to the error checking and re-fetching of lost or corrupted data that normally occurs using this type of transmission. Thus, the quality of data in the content stream at server 30 is generally high. The multicast distribution technique used to distribute content from server 30 to local proxy 80 is less reliable, but correctable by interpolation or other techniques. The overall result is a system that provides high quality content distribution while using a relatively small transmission bandwidth. Moreover, it will be understood that the content distribution system described herein may accept many forms of content, and distribute them using this system. The content may be though of as the "payload" portion of the data stream that is moved around as described herein and then reassembled (with possible error correction) by local proxy 80 for subsequent use by local terminals.

Figure 2:
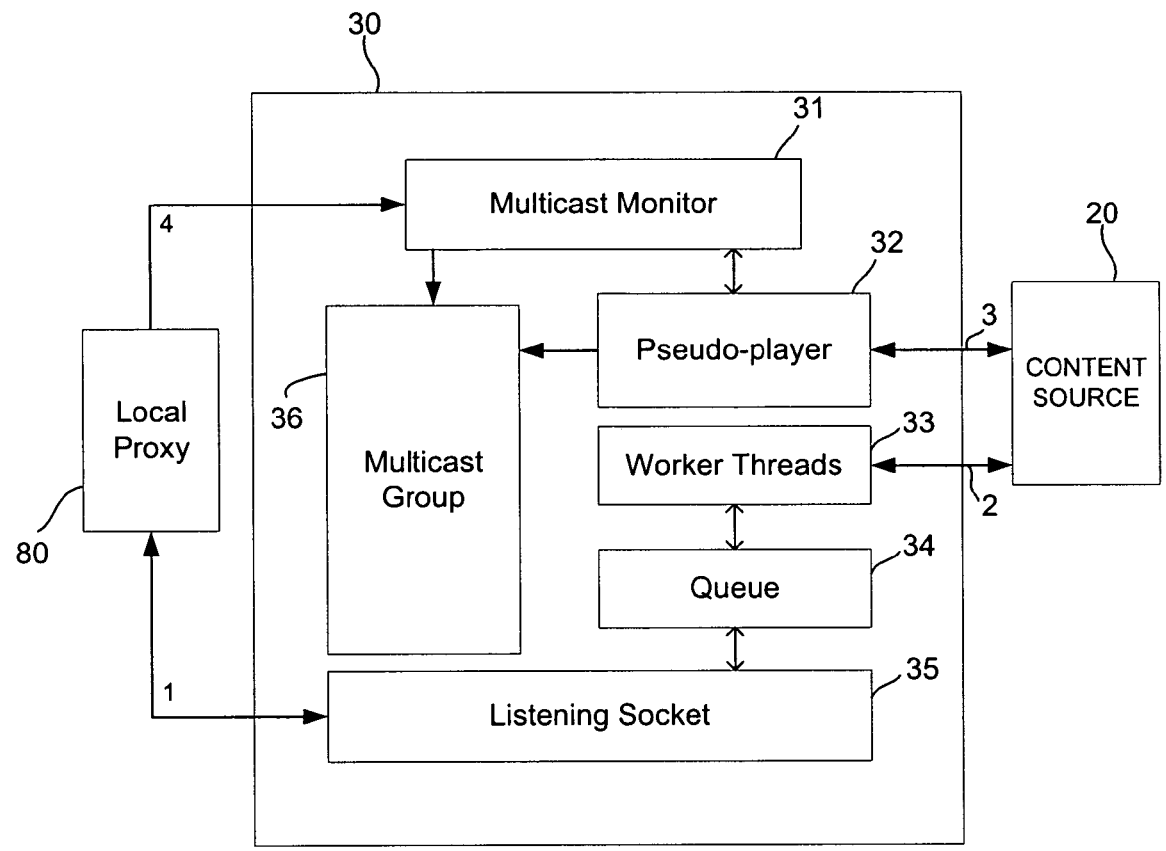
FIG. 2 is a detailed block diagram of the client-side media server depicted in FIG. 1.

FIG. 2 shows a more detailed depiction of the client-side server 30 shown in FIG. 1. As shown, server 30 may include multicast monitor 31, pseudo media player 32, worker threads 33, queue 34, listening socket 35, and from a high level organizational standpoint, multicast group 40. Local proxy 80 is coupled to listening socket 35 through communications link 1 and to multicast monitor through communications link 4.

When client-side server 30 activated, the software routines that govern its operations are initialized. This initialization process enables listening socket 35 (typically a virtual software entity that monitors incoming data streams) and directs it to monitor local proxy 80 for content requests and to place any such requests in queue 34 for subsequent processing by worker threads 33 (also a virtual machine or software entity responsible for, among other things, carrying out content queries). When such requests are received, they are routed from worker threads 33 through link 2 to content source 20.

When source 20 responds to the content request, the responsive content is forwarded to local proxy 80 (through multicast group 40) and the request is removed from queue 34. During this period, multicast monitor 31 monitors group 40 to determine if additional users are joining or leaving the group (i.e., requesting the same content currently being received or no longer interested in the content). In the case where another user joins the group, and is requesting content not currently being received, multicast monitor 31 directs pseudo player 32 to retrieve a unicast content stream from content source 20 and forward the data packets to multicast group 40 for possible format conversion and for distribution to the proper user terminals 50. In the case where monitor 31 detects no one is present in the user group, it directs pseudo-player 32 to terminate the content stream.

Another benefit of the content distribution network shown in FIGS. 1 and 2 is its ability to cope with load balancing and failover problems. In general, when a conventional multicast or unicast system encounters router failure or a bandwidth limitation problem, downstream users are frequently "cut off" from data streams because there no longer a direct path between the two points.

With the systems and methods described herein, however, significant additional routing options are available that make this problem far less likely. For example, if a particular user location has multiple client-side servers 30, these servers may be used to absorb the workload of a malfunctioning, overworked, or disconnected server 30, by merely reassigning (in software) user terminals 50 and multicast groups 40 from malfunctioning or overburdened server(s) 30 to properly operating servers. This may be done automatically by fault detection software such that the end user does not notice a service interruption (e.g., by sensing or anticipating a heartbeat failure or overcapacity in particular server 30 and effecting the switchover process immediately to balance the workload or reconnect to source 20).

Moreover, because network 10 merely requires a connection to content source 20 capable of supporting a unicast connection, multiple data paths to a particular client-side server 30 may be used to make a connection without being constrained by the need for specialized multicasting hardware, thereby improving the likelihood that an acceptable connection can be obtained even if the normal channels of communication are interrupted. This significantly reduces the chance that a particular user will be completely isolated from content source 20.

Figure 3:
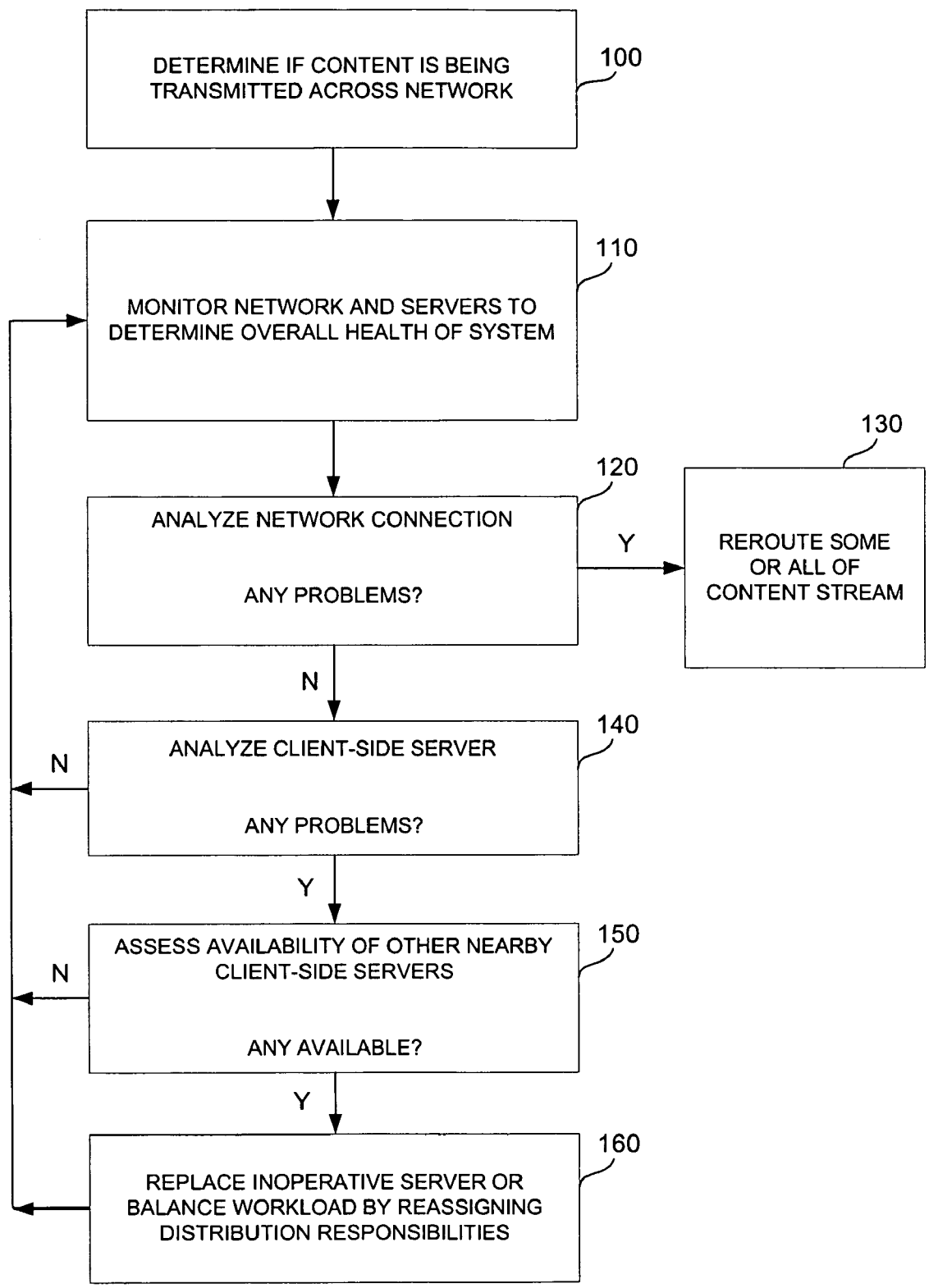
FIG. 3 is a flow chart representing some of the steps involved in detecting and correcting load balancing and service interruption problems in accordance with one embodiment of the present invention.

Some of the steps involved in monitoring the operation of system 10 to detect and correct potential failover or load balancing problems in accordance with the present invention are shown in the flow chart of FIG. 3. The functions described therein may be performed by fault detection software that may be deployed at client-side server 30, content source 20, at various points on Internet 25, or any combination thereof. Such fault detection software may be provided or maintained by a network service provider, a network administrator on the client side, or a combination of the two.

In operation, the fault detection software may monitor content source 20, client-side server 30, and the network connection between the two (Internet 25) to determine if content is being transmitted at step 100. If content is being transmitted, the fault detection program may monitor the network connection and client-side server to determine the overall "health" of the system by comparing various operating parameters to certain predetermined values such as throughput, bandwidth capacity and overall utilization (at step 110). If, after this comparison, it is determined that problems or potential problems exist, the appropriate remedial action is taken at steps 130 and 160 (or at least attempted).

For example, at step 120, the fault detection software may determine that the network connection between content source 20 and client-side server 30 is either malfunctioning or interrupted. If this is case, at step 130, the fault detection software may reroute the entire transmission path (for a service interruption) or may merely reroute some of the content through an alternate path if the currently used path is bandwidth limited to ensure a minimum quality of service. At this point, the fault detection software may also monitor the amount the network connection to ensure that a minimum amount of upstream bandwidth is available to service mission critical applications.

At step 140 the fault detection software may determine that a client-side server 30 at a particular site is either malfunctioning, overburdened, or inoperative. If this is the case, at step 150, the fault detection software may assess the availability and current workload of other nearby or associated client-side servers to determine if these servers may be used to either balance the workload or fully replace malfunctioning or inoperative servers. If some servers 30 are found to be available, then the fault detection software may reassign certain multicast groups or user terminals 50 to those servers at step 170. Once the systems returns to an acceptable operating state, the fault detection software may return to monitoring step 110.

Although several steps in the fault detection and monitoring process have been described above, it will be understood that these steps are merely illustrative, and are not meant to be comprehensive or necessarily performed in the order shown.

Moreover, while the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing streamed electronic content to a plurality of user terminals in a client network from at least one remote electronic content source, the method comprising:

receiving at a client-side computer requests from two or more user terminals in the client network for a common desired streamed content from the at least one remote electronic content store;

said client-side computer forwarding at least one content request to the at least one remote electronic content store for the common desired streamed content;

receiving by the client-side computer from the at least one content source a streamed unicast transmission of the requested content in response to said at least one content request;

said client-side computer distributing the received streamed content corresponding to said streamed unicast transmission to each of the requesting plurality of user terminals in the client network; and said client-side computer being operative in terminating the content transmission being received by the client-side computer from the at least one content source when the client-side computer is not distributing the content to any of the requesting user terminals.

2. The method of claim 1 wherein distributing the received streamed content comprises distributing the content to a multicast group including each of the user terminals in the client network which has provided a request for content by subscribing to the multicast group.

3. The method of claim 1 comprising transmitting additional content from the at least one content source to the client-side computer in response to a request by at least one user terminal in the client network for content not currently being transmitted by the at least one content source to the client-side computer.

4. The method of claim 3 wherein transmitting the additional content comprises transmitting the additional content in another unicast transmission from the at least one content source to the client-side computer.

5. The method of claim 1 wherein the streamed unicast transmission comprises unicast format content converted from multicast format content for transmission to the client-side computer.

6. The method of claim 1 further comprising the client-side computer processing the received content, wherein said client-side computer processing comprises converting content received in a unicast format into a multicast format suitable for distribution to subscribers of a multicast group.

7. The method of claim 1 comprising monitoring streamed content and maintaining an amount of bandwidth suitable for servicing at least one application, other than an application servicing the distributed content, being run by each of the requesting user terminals.

8. The method of claim 1 wherein the content is transmitted across the Internet.

9. A system for providing streamed electronic content to a plurality of user terminals in a client network from a remote electronic content source, the system comprising:

a plurality of user terminals in a client network;

a content source which provides a streamed unicast transmission of content in response to the requests of two or more user terminals in the client network;

a client-side computer in the client network that is operative in forwarding to the content source at least one of the requests of the two or more user terminals, receiving the streamed unicast transmission of requested content, and distributing the received content to the requesting user terminals in the client network such that two or more of the requesting user terminals receive the requested content corresponding to the streamed unicast transmission, and terminating the content transmission being received by the client-side computer from the at least one content source when the client-side computer is not distributing the content to any of the requesting user terminals.

10. The system of claim 9 wherein the client-side computer comprises a listening socket for receiving and queuing content requests.

11. The system of claim 9 wherein the client-side computer includes software causing the client-side computer to form a multicast group including each of the user terminals in the client network which has provided a request for content by subscribing to the multicast group, the client-side computer comprising a monitoring program to monitor whether subscribers are requesting the content transmitted by the content source.

12. The system of claim 11 wherein the monitoring program includes software that terminates the content transmission if no subscriber within the multicast group is requesting the streamed content from the content source.

13. The system of claim 11 wherein the monitoring program includes software that requests transmission of an additional content stream if a subscriber within the multicast group is requesting content not currently being transmitted by the content source.

14. The system of claim 9 wherein the content source comprises circuitry that converts multicast format content into unicast format content for transmission to the client-side computer.

15. The system of claim 9 wherein the client-side computer comprises a pseudo media player that converts content received in unicast format into a multicast format suitable for distribution to the multicast group.

16. The system of claim 11 wherein the monitoring program includes software that ensures that a minimum amount of upstream bandwidth is preserved in a transmission path for accommodating application critical communications.

17. A method for providing streamed electronic content to a plurality of user terminals in a client network from a remote electronic content source, the method comprising:

receiving at a client-side computer requests from two or more user terminals in the client network for a common desired streamed content from the electronic content source;

said client-side computer forwarding at least one content request to the at least one remote electronic content store for the common desired streamed content;

forming a multicast group comprising user terminals that have provided requests for the streamed content;

receiving by the client-side computer from the at least one content source a streamed unicast transmission of the requested content in response to said at least one content request;

said client-side computer distributing the received content corresponding to said streamed unicast transmission to each of the requesting user terminals of the client network in the multicast group; and said client-side computer terminating the content transmission being received by the client-side computer from the at least one content source when the client-side computer is not distributing the content to any of the requesting user terminals.

18. A method for providing a minimum quality of service in a reduced bandwidth network that provides streamed electronic content to a plurality of user terminals in a client from a remote electronic content source, the method comprising:

receiving at a client-side computer requests from two or more user terminals in a client network for a common desired streamed content from the at least one remote electronic content store;

said client-side computer forwarding at least one content request to the at least one remote electronic content store for the common desired streamed content;

receiving by the client-side computer from the at least one content source a streamed unicast transmission of the requested content in response to said at least one content request;

said client-side computer distributing the received streamed content corresponding to said streamed unicast transmission to each of the requesting plurality of user terminals in the client network;

said client-side computer terminating the content transmission being received by the client-side computer from the at least one content source when the client-side computer is not distributing the content to any of the requesting user terminals; and monitoring the client-side computer for potential quality of service problems.

19. The method of claim 18 wherein the monitoring further comprises assessing the availability of other client-side computers.

20. The method of claim 19 further comprising replacing an inoperative client-side computer with a computer deemed available in the assessing step to maintain a minimum quality of service level.

21. The method of claim 19 further comprising reassigning at least part of a workload of a client-side computer deemed overburdened by fault detection software with a computer deemed available in the assessing step to balance client-side computer workload.

22. A system for providing streamed electronic content to a plurality of user terminals in a client network from a remote electronic content source, the system comprising:

a plurality of user terminals in a client network, each including a display device;

a content source which provides a streamed transmission in a unicast format of content in response to the requests of two or more user terminals in the client network;

a client-side computer in the client network that is operative in forwarding to the content source at least one of the requests of the two or more user terminals, receiving the streamed unicast format transmission of requested content, processing the streamed content into a multicast format, distributing the processed multicast format content to the requesting user terminals in the client network such that two or more of the requesting user terminals receive the requested content corresponding to the streamed unicast format transmission, and terminating the content transmission being received by the client-side computer from the at least one content source when the client-side computer is not distributing the content to any of the requesting user terminals;

each of the plurality of terminals in the client network including software for processing received streamed multicast format content into unicast format for display on a respective display device.

23. The system of claim 22 wherein each of the plurality of terminals in the client network includes a local proxy which includes the software.

24. A system for providing electronic content to a plurality of user terminals in a client network from a remote electronic content source, the system comprising:

a plurality of user terminals in a client network;

a content source which provides a streamed unicast transmission of content in response to the requests of two or more user terminals in the client network;

a client-side computer in the client network that is operative in forwarding to the content source at least one of the requests of the two or more user terminals, receiving the streamed unicast transmission of requested content, card distributing the received content to the requesting user terminals in the client network such that two or more of the requesting user terminals receive the requested content corresponding to the streamed unicast transmission, and terminating the content transmission being received by the client-side computer from the at least one content source when the client-side computer is not distributing the content to any of the requesting user terminals;

each of the plurality of terminals in the client network including a local proxy which prepares the distributed streamed content for display at the respective user terminal.

25. A method for providing streamed electronic content to a plurality of user terminals in a client network from a remote electronic content source, the system comprising:

providing a streamed transmission in a unicast format of content from the remote content source in response to the requests of two or more user terminals in the client network, at least one of the requests being forwarded to the remote content source by a client-side computer in the client network;

receiving the streamed unicast format transmission of requested content in the client-side computer in the client network;

processing the streamed content into a multicast format in the client-side computer;

distributing via the client-side computer the received and processed multicast format content to the requesting user terminals in the client network;

processing received streamed multicast format content into unicast format in the respective user terminal for display at a respective terminal; and said client-side computer being tenninating the content transmission being received by the client-side computer from the remote content source when the client-side computer is not distributing the content to any of the requesting user terminals.

* * * * *

UNITED STATES PATENT AND TRADEMARK OFFICE
CERTIFICATE OF CORRECTION

PATENT NO. : 7,546,355 B2 Page 1 of 1
APPLICATION NO. : 10/760137
DATED : June 9, 2009
INVENTOR(S) : Yury Kalnitsky It is certified that error appears in the above-identified patent and that said Letters Patent is hereby corrected as shown below:

Col. 10, Line 60 (in claim 25): "tenninating" should read --terminating--

Signed and Sealed this

Twenty-first Day of July, 2009

JOHN DOLL
*Acting Director of the United States Patent and Trademark Office*